United States Patent
Campbell

[11] 3,835,803
[45] Sept. 17, 1974

[54] TRIMMING PIPE SYSTEM FOR FREE-FLOWING CARGOES

[75] Inventor: George Thomas Richardson Campbell, Tokyo, Japan

[73] Assignee: Algoship International Limited, Nassau, Bahamas

[22] Filed: Apr. 25, 1972

[21] Appl. No.: 247,341

[52] U.S. Cl. ................................................. 114/73
[51] Int. Cl. ............................................ B63b 25/02
[58] Field of Search .................. 114/72, 73; 214/15; 296/15; 141/67, 325; 52/195, 196, 198; 222/569, 572

[56] References Cited
UNITED STATES PATENTS
3,678,875   7/1972   Campbell & Onta ................ 114/73

Primary Examiner—George E. A. Halvosa
Assistant Examiner—Sherman D. Basinger
Attorney, Agent, or Firm—Fetherstonhaugh & Company

[57] ABSTRACT

A vessel has a hull with decks defining cargo holds, and loading hatches for the holds extend through the decks. Open-ended trimming pipes slant downwardly and outwardly from walls of the hatches to communicate with the holds at points spaced outwardly from the hatches. The decks are supported at their underside by substantially horizontal girders, and additional open-ended trimming pipes extend through the girders so that free-flowing cargo deposited through the hatches into the holds also flows through the two sets of trimming pipes for trimming of the cargo in regions of the holds remote from the hatches.

3 Claims, 1 Drawing Figure

PATENTED SEP 17 1974　　　　　　　　　3,835,803
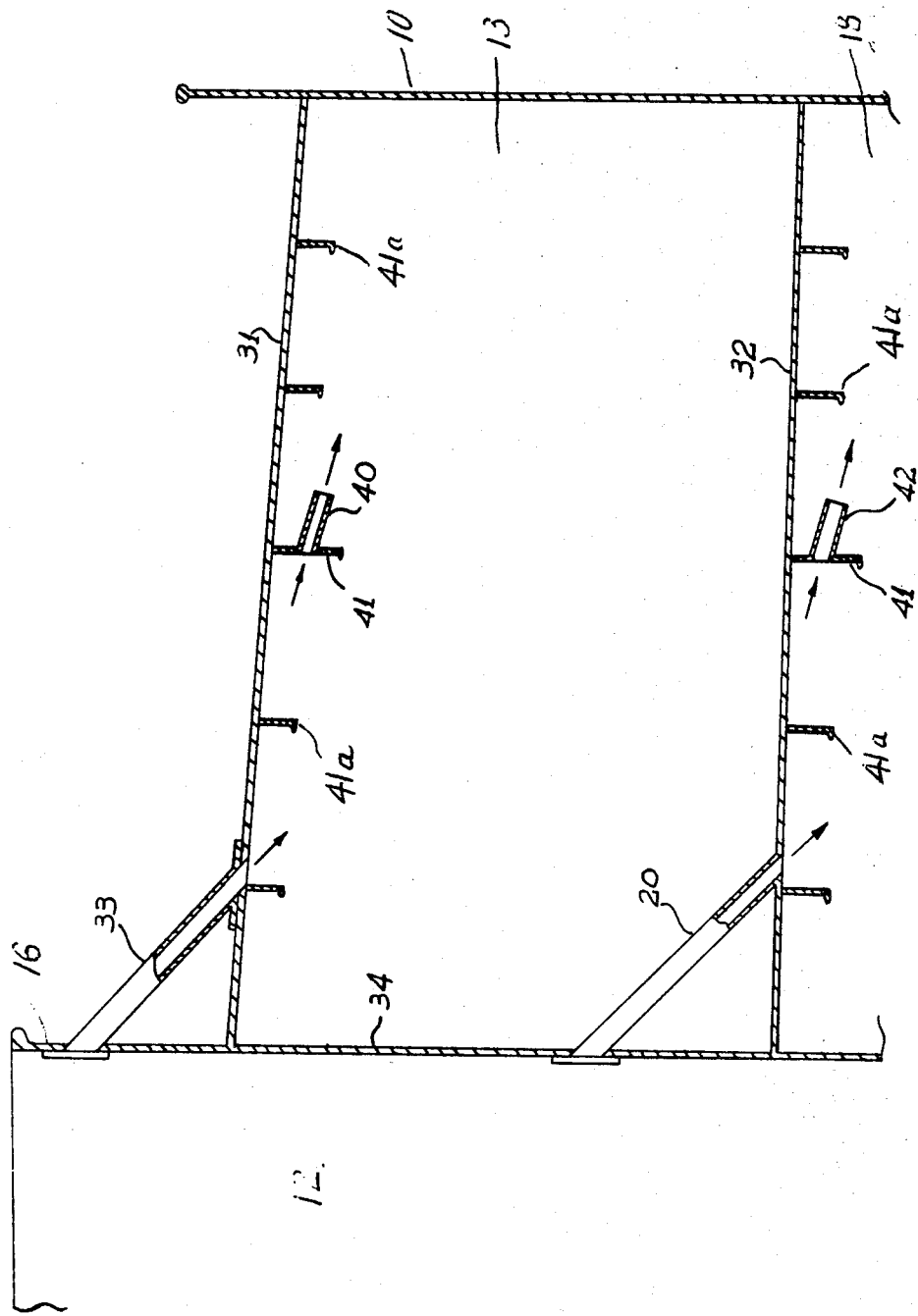

ically configured wing tank, the upper deck 31 being provided with a hatch opening 33 for loading cargo into the hold or holds below the deck.

TRIMMING PIPE SYSTEM FOR FREE-FLOWING CARGOES

RELATED APPLICATION

The invention herein is an improvement on the Trimming Pipe System disclosed in copending U.S. Pat. application Ser. No. 49,734 filed June 25, 1970 by George T. R. Campbell and Kimio Ohta, now U.S. Pat. No. 3,678,875 dated July 25, 1972.

This invention relates to new and useful improvements in the art of stowage of free-flowing cargoes in ships, and particularly concerns itself with a structural arrangement whereby free-flowing cargo may be caused to fill a maximum amount of available space in holds under the decks of a ship.

The invention is particularly applicable for use in multi-purpose dry cargo vessels built for carrying different types of cargo such as automobiles, containers, timber, etc. These vessels, to be efficient and economical, must meet two fundamental requirements, namely, construction of the hull must be simple and structurally efficient, and the volume of the holds must be as large as possible. Almost all self-trimming conventional dry bulk carriers and multi-purpose vessels are fitted with port and starboard topside wing tanks inclined at an angle of approximately 30° to the horizontal in order to avoid trimming of the cargo and to minimize the shifting of grain and other free-flowing cargoes horizontally in each hold. This sloped construction of the wing tanks when incorporated in the holds of conventional vessels entails some disadvantages, the major of which are:

a. the shape of the transverse section of the holds does not permit the most effective use of steel as strength members;

b. the construction of the topside tanks is complex;

c. the space occupied by the sloped section of the topside tanks below longitudinal hatch girders reduces the available space for cargo within the holds, and this loss of space is very substantial on vessels having small area hatch openings;

d. considerable broken stowage occurs in the upper portion of the cargo holds when used for carriage of packaged freight, lumber, newspring, etc., because of the sloped undersurface of the wing tanks, so that the cost of stowage and securing of such cargo under the sloped wing tanks is much increased;

e. when vessels having such wing tanks are used in automobile or container transport, the loss of usable cubic capacity occasioned by the sloped construction is even greater.

Although the main purpose in providing the sloped upper wing tanks has been to avoid trimming of cargoes such as grain, when engaged in such cargoes, the loss of cubic capacity resulting from the sloped construction materially reduces the tonnage of the cargo carried.

Some conventional vessels have been provided with grain feeder hatches on the upper deck at the side of the main hatches and in between hatches, instead of the sloped wing tanks. When loading with this arrangement, the grain loading machine must be stopped and the feeding pipe of the machine shifted from the main hatch to the feeder hatches, which is a time-consuming procedure and increases the cost of loading. Also, in several ports, the outreach of the grain loading machine is limited so that grain cannot be loaded through the feeder hatches remote from the machine, and the vessel must be turned around in order to complete the loading procedure.

It is therefore apparent that in both types of conventional construction, that is, sloped upper wing tanks and side feeder hatches, there is considerable restriction in the cargo carrying features and earning capacity of the vessel.

The present invention, by embodying a simple grain loading arrangement, permits the application of the most efficient use of structural steel when applied to vessels with single upper decks, or alternatively rectangular upper wing tanks, and obtains the maximum cubic capacity without the attending disadvantages as above outlined.

As disclosed in the aforementioned U.S. Pat. application Ser. No. 49,734, the invention provides open-ended trimming pipes which slant downwardly and outwardly from the walls of the main loading hatch so that they communicate with the cargo holds at points spaced outwardly from the hatch, so that free-flowing cargo deposited into the holds through the hatch also flows through the trimming pipes for trimming of the cargo in regions of the holds remote from the hatch. The trimming pipes, in addition to being installed transversely of the vessel, may also be installed longitudinally to feed the cargo into the fore and aft portions of the holds away from the loading hatch. Such trimming pipes as disclosed in the aforesaid U.S. Pat. application No. 49,734 satisfactorily perform their intended function, but some problems are still encountered in trimming cargo at the top of the holds where supporting girders extend along the underside of the decks and interfere with free flowing of the cargo. Such problems were encountered even in vessels with conventional sloped wing tanks, without the trimming pipes, and it has been common to provide the girders with openings to permit the flow of grain therethrough. However, this was not always satisfactory, since the flow tends to be rather sluggish.

The principal object of the present invention is to facilitate very efficient trimming of cargo and filling of the holds to maximum capacity, this being attained by providing the trimming pipes as disclosed in the aforementioned U.S. Pat. application No. 49,734 in conjunction with an additional set of open-ended trimming pipes which extend through the deck supporting girders, so that very effective trimming of cargo at the top of the holds is obtained in regions of the holds remote from the main loading hatch.

With the foregoing more important object and features in view and such other objects and features which may become apparent as this specification proceeds, the invention will be understood from the following description taken in conjunction with the accompanying drawing, in which like characters of reference designate like parts and in which the single drawing Figure is a fragmentary cross-sectional view of a ship's hull with decks and holds at one side of a loading hatch, embodying the two sets of trimming pipes in accordance with the present invention.

Referring now to the accompanying drawing in detail, the numeral 10 designates the hull of a ship having an upper deck 31 and a lower deck 32 which, in the instance shown, may constitute the bottom of a rectangular wing tank 13 located above a cargo hold 18, although alternatively the space 13 may itself be a cargo hold if the vessel is not equipped with wing tanks. In any event, vertical walls, one of which is shown at 34, extend through the decks 31, 32 and define a main loading hatch 12 for the hold 18, and also for the space 13 if the latter is a cargo hold rather than a wing tank. The walls 34 extend above the upper deck 31 and constitute a hatch coaming 16.

In accordance with the aforesaid U.S. Pat. application No. 49,734, a series of open-ended cargo trimming pipes 20 and 33 slant downwardly and outwardly from the hatch walls 34 to the respective decks 32, 31 and communicate with the holds 18 and 13, respectively, at points spaced outwardly from the walls 34, so that free-flowing cargo deposited into the holds through the hatch may also flow through the trimming pipes 20, 33 for trimming of the cargo in regions of the holds remote from the hatch 12. The term "outwardly" as used herein may be either or both, transversely toward the sides of the hull or in a fore-aft direction longitudinally of the vessel, but in either event it is in a direction away from the main loading hatch 12. Also, while the primary set of trimming pipes 20, 33 has herein been shown for illustrative purposes only, this set of pipes may have a more complicated arrangement as disclosed in the various modifications in the aforesaid U.S. Pat. application No. 49,734.

The present invention deals mainly with the provision of an additional set of open-ended cargo trimming pipes indicated at 40 and 42 which cooperate with the primary set of pipes 33, 20 in facilitating free trimming of cargo such as grain in the upper strata of the holds 13, 18 where efficient trimming action is usually obstructed by girders 41. These girders extend substantially horizontally along the underside of the decks 31, 32 for supporting the same, and their presence usually interferes with free trimming of cargo in the upper strata of the holds which are located below the decks.

In accordance with the present invention the second set of trimming pipes 40, 42 is supported by and extends through the girders 41, the girders being provided with suitable openings with which the pipes are in register and the pipes being secured to the girders in any suitable manner, such as by welding. As will be noted, the pipes 40, 42 are located in the girders 41 at points spaced outwardly from the lower ends of the primary set of trimming pipes 33, 20. The pipes 40, 42 preferably extend from the girders 41 in an outward direction, that is, away from the hatch walls 34, and these pipes are of sufficient length and are preferably downwardly slanted as shown, so that grain flows effectively through the pipes to trim the regions of the holds remote from the hatch.

In addition to the girders 41, the decks 31, 32 may be supported by other girders such as those indicated at 41a, and the trimming pipes 40, 42 need not be provided in all of these girders, if they do not materially interfere with the outward flow of grain. However, the pipes should be provided in those girders which are relatively deep, such as the girders 41 which are shown as being deeper than the girders 41a. To the extent that the trimming pipes are provided in the girders, a sufficient number of pipes should be provided at longitudinally spaced points on each girder to ensure complete filling of the hold space outwardly of the girders in which the pipes are fitted.

As distinguished from simple openings or holes conventionally provided in the deck girders, the downwardly slanted trimming pipes 40, 42 greatly assist in free flow of the cargo from the inner to the outer side of the girders. Also, it will be noted that with the trimming pipe arrangement as shown, it is not necessary to construct the wing tank 13 with a sloping bottom in order to obtain self-trimming of grain or other free-flowing cargo, and the wing tank may have a substantially rectangular configuration in cross-section, as illustrated, and efficient trimming of cargo may be obtained even in the upper strata where interference would otherwise be encountered with girders such as those at 41.

While in the foregoing there has been described and shown the preferred embodiment of the invention, various modifications may be resorted to within the spirit and scope of the invention as claimed.

What is claimed as new is:

1. In a cargo carrying vessel, particularly adapted to carry free flowing cargo, a deck, substantially horizontal longitudinally extending girders provided on the underside of the deck to support the deck, a cargo hold of essentially inverted T shape including a lower portion which extends across the ship beneath the said deck and an upper central extension defined by hatch walls which extend above the said deck to a main loading hatch, open ended cargo trimming pipes slanting downwardly and outwardly from said hatch walls to and through the deck to place the upper central extension into communication with the lower portion of the hold at points spaced outwardly from said hatch walls, and additional open ended cargo trimming pipes extending through said girders at points spaced outwardly from the lower ends of the first mentioned trimming pipes, each said additional trimming pipe extending from its respective girder downwardly and outwardly and being of a sufficient length to impart to the free flowing cargo passing therethrough an outward velocity, for trimming the cargo in regions of the hold outwardly of said additional trimming pipes.

2. A cargo carrying vessel as set forth in claim 1, including an upper deck above the first said deck, said upper deck also including substantially horizontal longitudinally extending girders provided on the underside thereof to support the same, said hatch walls extending above the said upper deck, whereby a separated cargo area is formed outwardly of the hatch walls between the first said and upper decks, open ended cargo trimming pipes slanting downwardly and outwardly from said hatch walls to an through the upper deck to place the upper central extension into communication with said separated cargo area, and additional open ended cargo trimming pipes extending through the said girders supporting the upper deck at points spaced outwardly from the lower ends of the trimming pipes extending into said separated cargo area, said additional trimming pipes being of a sufficient length to impart to the free flowing cargo passing therethrough an outward velocity, for trimming the cargo in regions of the hold outwardly of said additional trimming pipes.

3. A cargo carrying vessel according to claim 1, wherein said additional trimming pipes are directed downwardly and outwardly at an angle directed below the bottom of the next outer adjacent girders so that the free flowing cargo projected outwardly by the additional trimming pipes will not be blocked by the said adjacent girder.

* * * * *